(12) United States Patent
Wilssens (10) Patent No.: US 11,196,787 B2
(45) Date of Patent: Dec. 7, 2021

(54) SERVER-SIDE RENDERED AUDIO USING CLIENT AUDIO PARAMETERS

(71) Applicant: Microsoft Technology Licensing, LLC, Redmond, WA (US)

(72) Inventor: Steven Wilssens, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 16/505,516

(22) Filed: Jul. 8, 2019

(65) Prior Publication Data

US 2021/0014294 A1 Jan. 14, 2021

(51) Int. Cl.
*H04L 29/06* (2006.01)

(52) U.S. Cl.
CPC ........ *H04L 65/602* (2013.01); *H04L 65/1059* (2013.01); *H04L 65/1063* (2013.01); *H04L 67/42* (2013.01)

(58) Field of Classification Search
CPC .............. H04L 65/602; H04L 65/1059; H04L 65/1063; H04L 67/42
See application file for complete search history.

(56) References Cited

U.S. PATENT DOCUMENTS

| | | |
|---|---|---|
| 2008/0293356 A1 | 11/2008 | Kummernuss |
| 2010/0169410 A1 | 7/2010 | Lund et al. |
| 2014/0195594 A1* | 7/2014 | Ahuja .............. H04N 21/25816 709/203 |
| 2014/0226713 A1* | 8/2014 | Perlman ................. H04N 19/61 375/240.02 |
| 2017/0150289 A1* | 5/2017 | Baalu ..................... G06F 16/686 |
| 2017/0185371 A1* | 6/2017 | Lin ......................... G06F 3/165 |
| 2018/0151187 A1* | 5/2018 | Sorensen .............. H04M 3/568 |

FOREIGN PATENT DOCUMENTS

GB 2550877 A 12/2017

OTHER PUBLICATIONS

"International Search Report and Written Opinion Issued in PCT Application No. PCT/US20/033009", dated Jul. 30, 2020, 11 Pages.

* cited by examiner

*Primary Examiner* — Nicholas R Taylor
*Assistant Examiner* — Sanjoy Roy
(74) *Attorney, Agent, or Firm* — Alleman Hall Creasman & Tuttle LLP (57) ABSTRACT

A server system is provided that includes at least one processor configured to receive a set of client audio parameters from a client computing device, determine a set of audio tuning parameters based on the set of client audio parameters, execute a server-side rendered application program for the client computing device, render a stream of visual data for the server-side rendered application program based on a stream of user input received from the client computing device, render a stream of audio for the server-side rendered application program based on the set of audio tuning parameters, and send the stream of visual data and the stream of audio to the client computing device.

20 Claims, 6 Drawing Sheets

SERVER-SIDE RENDERED AUDIO USING CLIENT AUDIO PARAMETERS

BACKGROUND

Thin client computing devices and mobile computing devices often lack the processor power required to run applications that have high CPU and GPU requirements. However, server-side rendering techniques that execute these applications on a cloud platform and provide the rendered visuals and audio for the application to the client computing device may allow users to engage with these applications even though their client computing device does not meet the required hardware specifications for that application.

SUMMARY

A server system is provided. The server system may comprise at least one processor configured to receive a set of client audio parameters from a client computing device, determine a set of audio tuning parameters based on the set of client audio parameters, execute a server-side rendered application program for the client computing device, render a stream of visual data for the server-side rendered application program based on a stream of user input received from the client computing device, render a stream of audio for the server-side rendered application program based on the set of audio tuning parameters, and send the stream of visual data and the stream of audio to the client computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
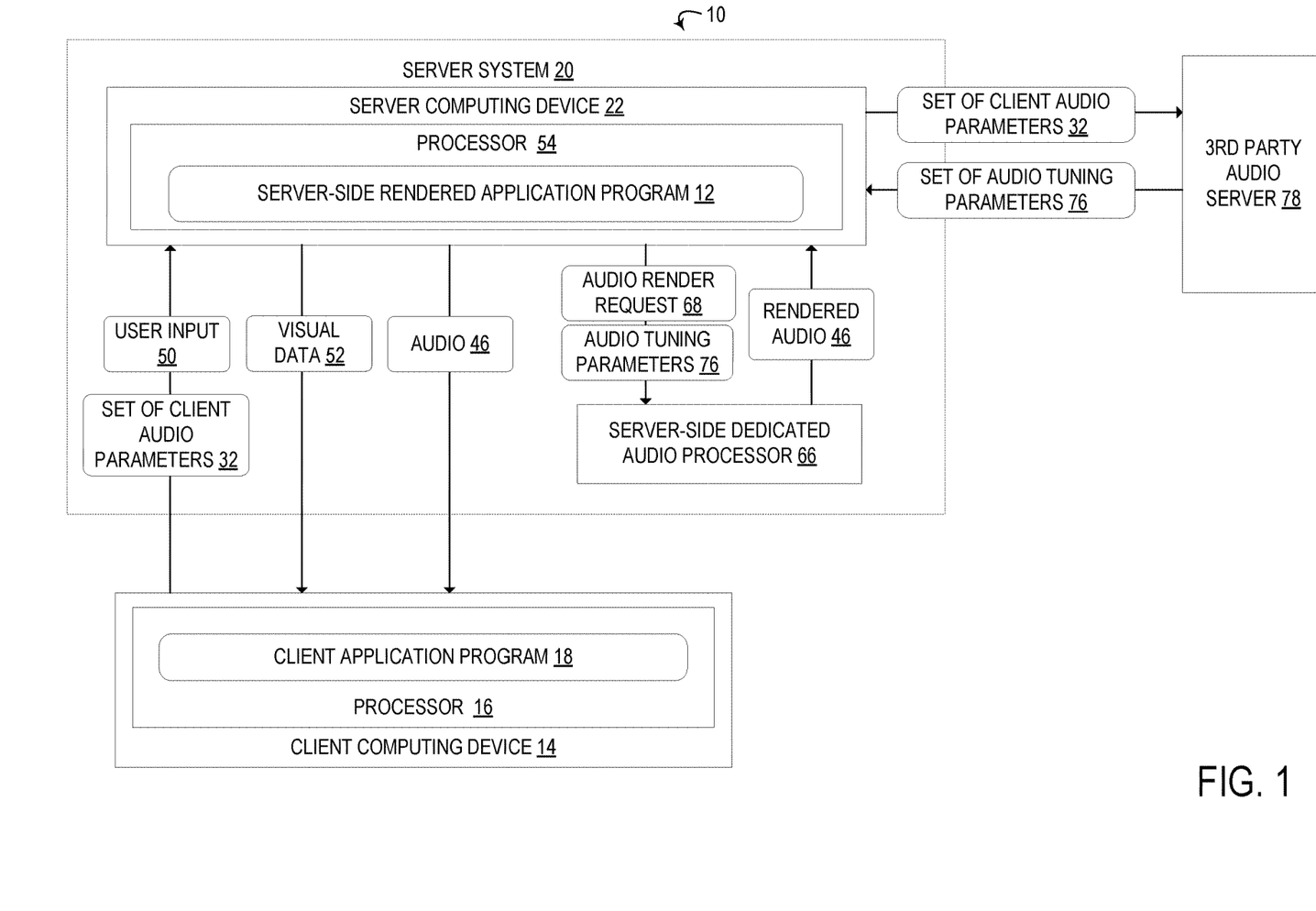
FIG. 1 shows a schematic view of an example computing system for rendering visual data and audio for a server-side rendered application program according to one embodiment of the present disclosure.

FIG. 1 illustrates a computing system 10 that presents visuals and audio for a server-side rendered application program 12 to a user of a client computing device 14. As illustrated, a processor 16 of the client computing device may be configured to execute a client application program 18 that communicates with a server system 20 of the computer system 10. In one example, the server system 20 include a plurality of server computing devices 22 that are collectively configured to operate in a cloud computing configuration. Each server computing device 22 may be configured to execute separate instances of the server-side rendering application program 12, which may each be associated with separate client computing devices 14. In one specific example, the server-side rendered application program 12 may take the form of a game application. However, it should be appreciated that the server-side rendered application program 12 may take other suitable forms, such as, for example, an audio or music application that does not include server-side rendered visuals.

Figure 2:
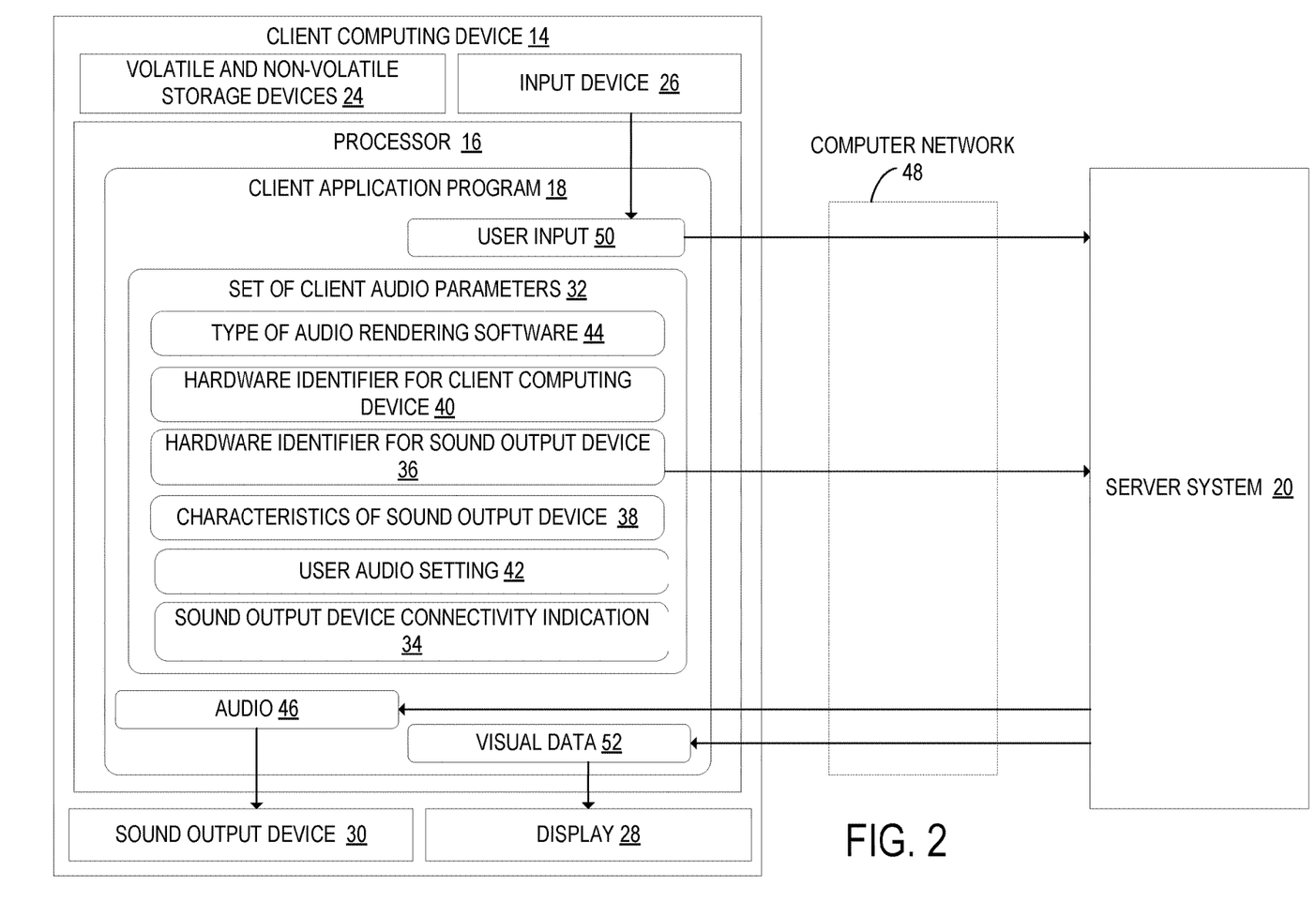
FIG. 2 shows a schematic view of a client computing device of the example computing system of FIG. 1.

FIG. 2 illustrates an example client computing device 14 that is configured to communicate with the server system 20. The client computing device 14 may include a processor 16, volatile and non-volatile storage devices 24, one or more input devices 26, a display 28, a sound output device 30, and other suitable computing components. In one example, the client computing device 14 may take the form of a mobile computing device such as a smart phone having a capacitive touch display that includes both the input device 26 and the display 28. In this example, the sound output device 30 may include speakers integrated into a housing of the mobile computing device. As another example, the sound output device 30 may include headphone or earbud devices that are coupled to the client computing device 14 by wired or wireless mediums. In another example, the client computing device 14 may take the form of a thin client computing device, a head mounted display device, or any other suitable type of computing device configured to present visuals and/or sound from a server-side rendered application program.

The processor 16 of the client computing device 14 may be configured to execute the client application program 18 that is associated with the server-side rendered application program 12 executed by server computing devices 22 of the server system 20. The client application program 18 may include a graphical user interface (GUI) that is presented via the display 28. The user may interact with the client application program 18 via the one or more input devices 26 of the client computing device 14, and rendered visuals and sound for the server-side rendered application program 12 may be presented via the GUI of the client application program 18. Application logic, application state, and application rendering may be handled in the background by one or more server computing devices 22 of the server system 20 and presented via client application program 18 executed on the client computing device 14.

To render audio that is tuned for the client computing device 14 of the user, the client application program 18 may be configured to determine a set of client audio parameters 32 for a user of the client computing device 14. The set of client audio parameters 32 may include one or more different types of audio parameters. In one example, the client application program 18 may be configured to detect the sound output device 30 communicatively coupled to the client computing device 14, and determine one or more different types of client audio parameters based on the detected sound output device 30. In one example, the set of client audio parameters 32 includes an indication 34 of whether a sound output device 30 is currently communicatively coupled to the client computing device 14. If a sound output device 30 is not currently coupled to the client computing device 14, then network bandwidth and computing resources may be saved by halting sound rendering until a sound output device 30 is detected. The sound output device 30 may be communicatively coupled to the client computing device via wired or wireless mediums. The client application program 32 may be configured to store as audio parameters both the hardware identifier 36 of a known sound output device 30 that the user has coupled to the client computing device 14 previously, as well as the indication 34 of whether that known sound output device 30 is currently connected.

In another example, the set of audio parameters 32 may include a hardware identifier 36 for the sound output device 30, such as, for example, a manufacturer serial number or another type of hardware identifier. The set of audio parameters 32 may also include a type of sound output device 30, which may take the form of a headphone device, an earbud device, a home theater sound system, a speaker integrated in a housing of a mobile computing device, or any other suitable type of sound output device 30.

Different sound output devices 30 may have different acoustic, geometric, and electronic characteristics that will affect audio playout. That is, the same audio signal may sound different depending on the characteristics of the sound output device 30. In one example, the set of audio parameters 32 may include one or more characteristics 38 of the sound output device 30 such as, for example, a geometry, a frequency response, a sensitivity, and an impedance of the sound output device 30. However, it should be appreciated that other characteristics 38 of the sound output device 30 may also be determined and included in the set of audio parameters 32, such as a home theater setup/layout, a material of the speaker cone, a size of the speaker, and other speaker characteristics not specifically described above. The set of audio parameters 32 may also include other types of parameters, such as, for example, a listener orientation, an object size, an emitter shape, an emitter orientation, and other types of audio parameters that may be used to customize the streaming audio for the user's device.

In another example, the set of client audio parameters 32 may includes a hardware identifier 40 of the client computing device 14, such as, for example, a manufacturer serial number or another type of hardware identifier 40. The hardware identifier 40 may also include identifiers for computer components, such as, for example, a sound card or sound processing device of the client computing device 14. The hardware identifier 40 may indicate a model of the client computing device 14, such as, a particular model of a mobile computing device.

The client computing device 14 may store global user audio settings that are set by an operating system or audio driver executed by the processor 16 of the client computing device 14. The client application program 18 may also include local user audio settings. These user audio settings may include, for example, volume, equalizer settings, sound/audio effects, and other types of audio settings. As illustrated in FIG. 2, the set of audio parameters 32 may include user audios settings 42 selected by a user of the client computing device, which may include one or more of the global and/or local user audio settings.

The server system 20 may be configured to render a stream of audio 46 for the server-side rendered application program 12 using different types of audio rendering software 44. For example, the stream of audio 46 may be rendered using a first-party audio rendering software of the server system 20. As another example, the stream of audio 46 may be rendered using third-party audio rendering software, such as, for example, DOLBY ATMOS, DTS:X, and other third-party audio rendering software. As another example, the type of audio rendering software 44 may specify whether the stream of audio 46 should be rendered for headphones vs a home theater speaker system. In these examples, the set of audio parameters 32 may include the type of audio rendering software 44 for rendering the stream of audio 46 for the server-side rendered application program 12. The type of audio rendering software 44 may be user selected or programmatically selected. For example, the type of audio rendering software 44 may be programmatically selected based on a hardware identifier 36 or characteristics 38 of the sound output device 30. It should be appreciated that the types of audio rendering software 44 described above are merely exemplary, and that other types of audio rendering software 44 may be selected for rendering the stream of audio 46.

As illustrated in FIG. 2, the client application program 18 may be configured to determined one or more of the audio parameters described above, and send the set of client audio parameters 32 to the server system 20 configured to execute the server-side rendered application program 12 over a computer network 48, which, for example, may be a Wide Area Network (WAN). It should be appreciated that the examples of audio parameters 32 described above are merely exemplary, and that other types of audio parameters 32 may be determined by the client application program 18 and sent to the server system 20.

The client application program 18 may be configured to detect user input 50 received from the one or more input devices 26. In a game application example, the user input 50 may be navigation input, GUI input, or other types of user input 50 for the server-side rendered application program 12. The client computing device may be configured to send a stream of the user input 50 for the server-side rendered application program 12 to the server system 20.

As will be discussed in more detail below, the server system 20 may render visual data 52 for the server-side rendered application program 12 based on an application state of the server-side rendered application program 12 and the stream of user input 50. The server system 20 may also rendered a stream of audio 46 for the server-side rendered application program 12 based on the set of client audio parameters 32 and the application state of the server-side rendered application program 12. The rendered visual data 52 and the rendered audio 46 may be sent to the client computing device 14 over the computer network 48.

As illustrated in FIG. 2, the client application program 18 may be configured to receive the stream of visual data 52 and the stream of audio 46 for the server-side rendered application program 12 from the server system 20. The client application program 18 may be further configured to present the stream of visual data 52 via the display 28 of the client computing device 14, and playout the stream of audio 46 via the sound output device 30. In this manner, the user may interact with the server-side rendered application program 12 by entering user input 50 into the input device 26, and view/hear corresponding visuals and audio of the server-side rendered application program 12.

Turning back to FIG. 1, the user input 50 and the set of client audio parameters 32 may be sent from the client computing device 14 to the server system 20. The server system 20 may be configured to assign at least one processor 54 of a server computing device 22 of the server system 20 to execute an instance of the server-side rendered application program 12 for the client application program 18 of the client computing device 14. The user input 50 and the set of client audio parameters 32 may be routed by the server system 20 to the assigned one or more processors 54. In one example, the server-side rendered application program 12 may be executed within a virtualized computing environment that may use computing resources from a plurality of processors 54 and server computing devices 22 in a cloud computing configuration.

As illustrated in FIG. 1, the server computing device 22 assigned to the client application program 18 executed by the client computing device 14 may be configured to receive the stream of user input 50 and the set of client audio parameters 32 from the client computing device 14. The server-side rendered application program 12 may be configured to process the stream of user input 50 and the set of client audio parameters 32 to generate a stream of rendered audio 46 and rendered visual data 46 that is sent back to the client computing device 14.

Figure 3:
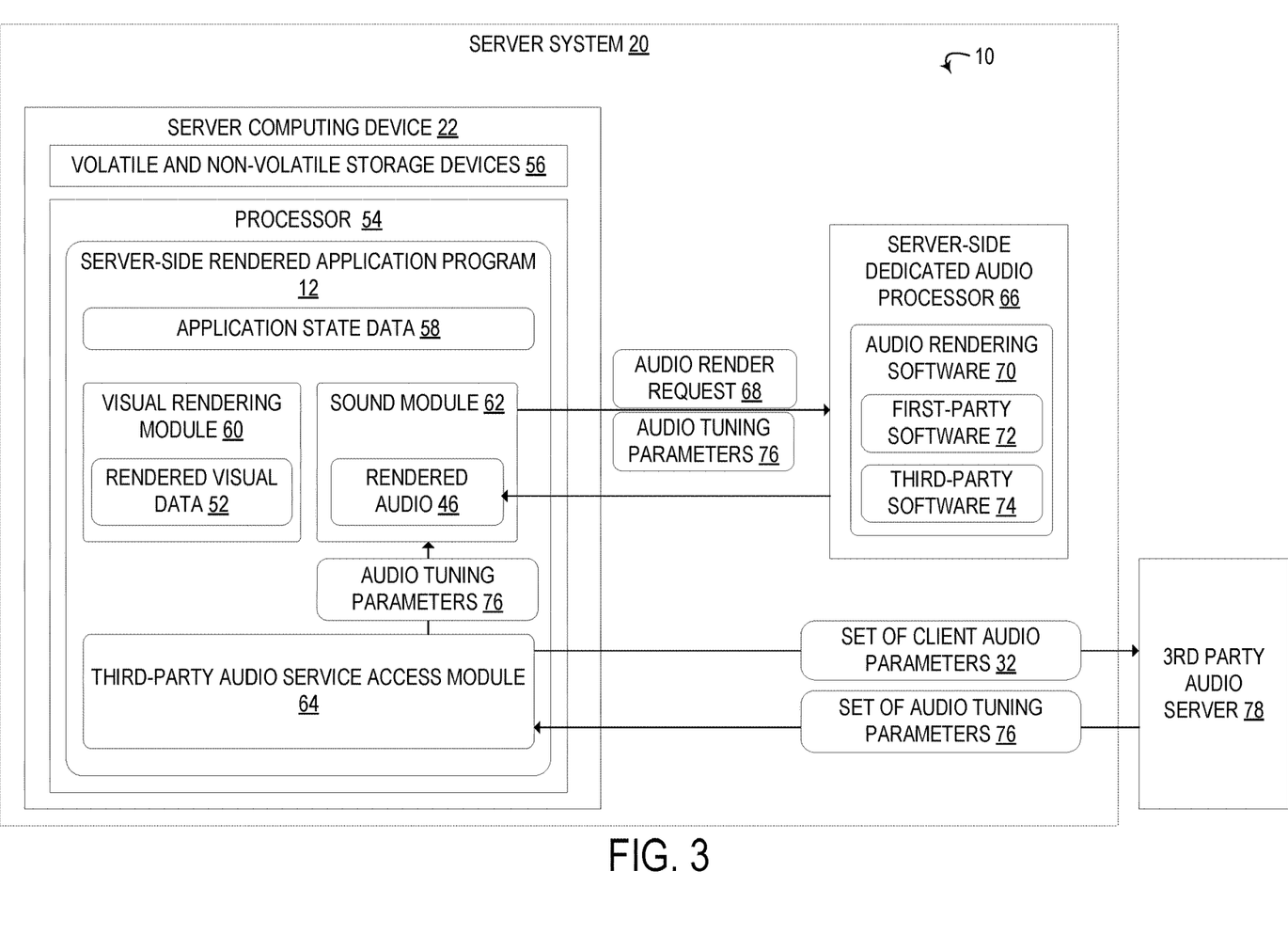
FIG. 3 shows a schematic view of a server system of the example computing system of FIG. 1.

FIG. 3 illustrates a schematic view of a server computing device 22 of the server system 20. As shown, the server computing device 22 may include at least one processor 54, volatile and non-volatile storage devices 56, and other suitable computing components. The at least one processor 54 may execute the server-side rendered application program 12, which may include application state data 58, a visual rendering module 60, a sound module 62, and a third-party audio service access module 64. The application state data 58 may indicate a current state of the server-side rendered application program 12 for a current session with the client application program 18, and may be updated in response to application logic of the server-side rendered application program 12 and the stream of user input 50 received from the client computing device. For example, in a game application, the application state data 58 may indicate a current state of the game world including a user's character that may be controlled based on the user input 50.

The visual rendering module 60 may be configured to render a stream of visual data 52 for the server-side rendered application program 12 based on the application state data 58 and the stream of user input 50 received from the client computing device 14. For example, the visual rendering module 60 may be configured to render sequential frames based on the application state data 58 at a predetermined frame rate.

The sound module 62 may be configured to generate rendered audio 46 based on the application state data 58 that is synced with the rendered visual data 46. In one example, the audio 46 may be rendered by the at least one processor 54 of the server computing device 22. In another example, the server system 20 may further include a server-side dedicated audio processor 66 that may be configured to render the audio 46 for the server-side rendered application program 12. In this example, the sound module 62 may send an audio render request 68 to the server-side dedicated audio processor 66 that includes sound data from the application state data 58 that will be rendered by the server-side dedicated audio processor 66. Rendering audio using the dedicated audio processor 66 may reduce the computational burden on the at least one processor of the server computing device 22.

The sound data may be rendered using audio rendering software 70. In one example, the audio rendering software 12 may be first-party software 72. In another example, the audio rendering software 70 may be third-party software 74 that is developed and owned by a third party, such as, for example, DOLBY ATMOS, DTS:X, etc. In one example, to tune the audio rendering software 70 for the sound output device 30 and user settings of the client computing device 14, the sound module 62 may be configured to determine a set of audio tuning parameters 76 based on the set of client audio parameters 32.

The audio rendering software 70 that is executed by either the at least one processor 54 of the server computing device 22 or the server-side dedicated audio processor 66 may be configured to render the stream of audio 46 for the server-side rendered application program 12 based on the set of audio tuning parameters 76. For example, the audio rendering software 70 may use the audio tuning parameters 76 to determine how transforms for the audio will be performed during rendering. In this manner, the audio 46 may be rendered to suit the specific characteristics of the user's sound output device 30 and the user's audio settings. For example, the audio 46 may be rendered based on equalization levels set by the user. As another example, the audio may be rendered as stereo audio for headphone sound output devices, or as surround sound audio for home theater speaker sound output devices.

As yet another example, the audio may be rendered to differently based on the specific speaker cone geometry or material of the sound output device 30. As yet another example, specific audio tuning parameters 76 may be predetermined for specific hardware identifiers of client computing devices 14 and sound output devices 30. That is, the manufacturers of the client computing device 14 and sound output device 30 may work with the developers of the audio rendering software 70 to develop as set of audio tuning parameters 76 that are suitable for a particular sound output device 30 or client computing device 14.

In one example, the audio rendering software 70 is first-party software 72, and the sound module 62 of the server-side rendered application program 12 may be configured to determine the set of audio tuning parameters 76. In another example, the audio rendering software 70 is third-party software 74, and the audio tuning parameters 76 may be generated by a third-party audio server 78. For example, the third-party software 74 may be DOLBY ATMOS, and the third-party audio server 78 may be a DOLBY server that may be accessed by the third-party audio service access module 64 of the server-side rendered application program. In this example, the third-party audio service access module 64 may be configured to send the set of client audio parameters 32 to the third-party audio server 78, and receive the set of audio tuning parameters 76 from the third-party audio server 78.

In one example, the audio rendering software 70 may include a plurality of different first-party and third-party audio rendering software. For example, the audio rendering software 70 may include DOLBY ATMOS audio rendering software, DTS:X audio rendering software, etc. As discussed previously, the set of client audio parameters 32 may indicate the type of audio rendering software 44 that is to be used to render the audio. Each of these types of audio rendering software 44 may have different associated third-party audio servers 78 that may be accessed to obtain audio tuning parameters 76 for that audio rendering software. In this example, the third-party audio service access module 64 may be configured to select the third-party audio server 78 from among a plurality of third-party audio servers 78 based on the type of audio rendering software 44 in the set of client audio parameters 32. The third-party audio service access module 64 may then send the client audio parameters 32 to the selected third-party audio server 78, and receive the set of audio tuning parameters 76 that may be used to tune the audio rendering software 70 for rendering the stream of audio 46 for the server-side rendered application program 12.

As illustrated in FIG. 1, the server computing device 22 may send the stream of visual data 52 and the stream of audio 46 to the client computing device 14 for presentation to the user. During the session, the user may continue to enter user input 50 that is sent to the server computing device 22, and the server computing device 22 may render visual data 52 and audio 46 based on that user input 50 that is sent back to the client computing device 14. In this manner, the user of the client computing device 14 may engage with the content of the server-side rendered application program 12 using their client computing device 14.

Figure 4:
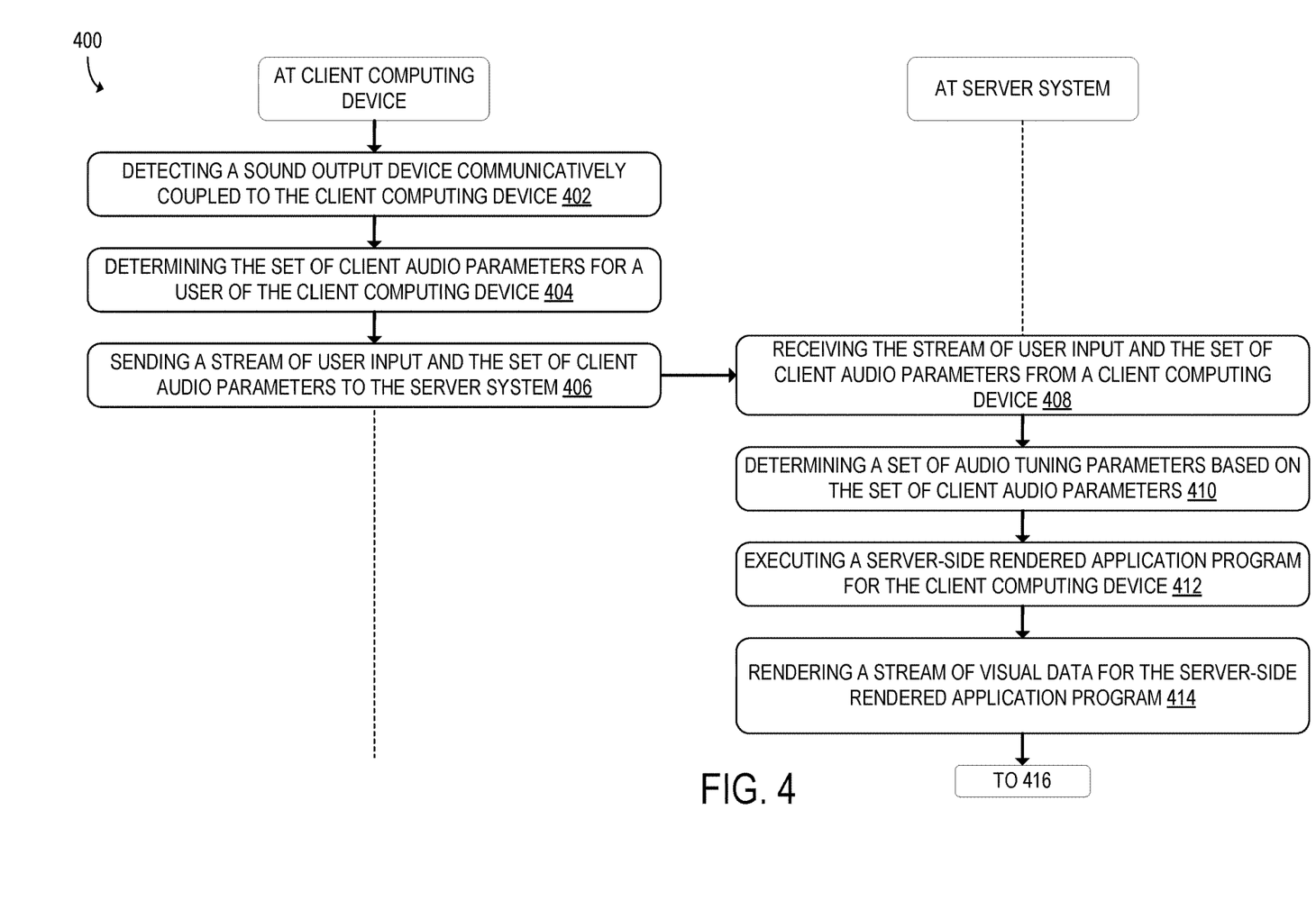
FIG. 4 shows an example method for rendering visual data and audio for a server-side rendered application program that may be implemented by the computing system of FIG. 1.
Figure 5:
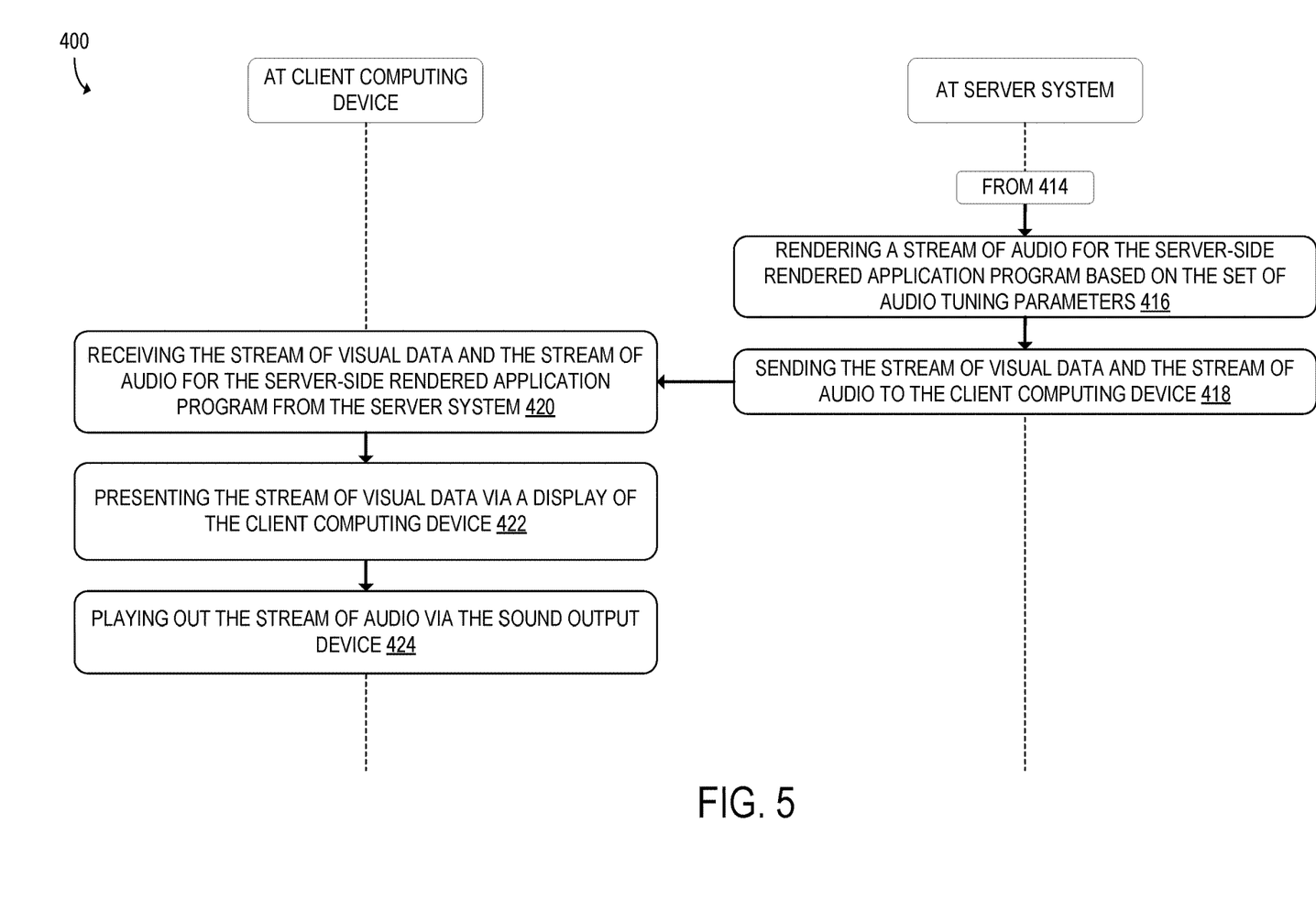
FIG. 5 continues the example method of FIG. 4.

FIG. 4 shows a flowchart for a computer implemented method 400 for presenting visuals and audio for a server-side rendered application program to a user. At 402, at a processor of a client computing device, the method 400 may include detecting a sound output device communicatively coupled to the client computing device. The sound output device may take the form of a headphone device, an earbud device, a speaker device, a home theater sound system, or another suitable type of sound output device. The sound output device may be communicatively coupled to the client computing device via wired or wireless mediums.

At 404, the method 400 may include determining a set of client audio parameters for a user of the client computing device. In one example, the set of client audio parameters may include a hardware identifier for a sound output device communicatively coupled to the client computing device. In another example, the set of client audio parameters may include a characteristic of the sound output device such as, for example, a geometry, a frequency response, a sensitivity, an impedance, or other characteristics of the sound output device. Other example client audio parameters that may be determined at step 404 are discussed above with reference to FIG. 1.

At 406, the method 400 may include sending a stream of user input and the set of client audio parameters to a server system. The stream of user input may be received via one or more input devices of the client computing device. The stream of user input and the set of client audio parameters may be sent to the server system over a computer network, such as, for example, a Wide Area Network.

At 408, at a processor of a server system, the method 400 may include receiving the stream of user input and the set of client audio parameters from the client computing device.

At 410, the method 400 may include determining a set of audio tuning parameters based on the set of client audio parameters. The set of audio tuning parameters may be used to configure audio rendering software to determine how transforms for the audio will be performed during rendering. In this manner, the audio may be rendered to suit the specific characteristics of the user's sound output device and the user's audio settings. For example, the audio may be rendered based on equalization levels set by the user. As another example, the audio may be rendered as stereo audio for headphone sound output devices, or as surround sound audio for home theater speaker sound output devices. Additional examples of audio tuning parameters are discussed above with reference to FIG. 3.

At 412, the method 400 may include executing a server-side rendered application program for the client computing device. The server-side rendered application program may be executed by at least one processor of a server computing device of the server system. The server-side rendered application program may render visuals and audio that are provided to a client application program for presentation to a user.

At 414, the method 400 may include rendering a stream of visual data for the server-side rendered application program based on a stream of user input received from the client computing device. The server-side rendered application program may include an application state that is determined based on the stream of user input. For example, the server-side rendered application program may take the form of a game application, and the application state may indicate a current state of the game world and a user's character that is controlled via the user input. The server-side rendered application program may rendered visual frames based on the current application state at a predetermined frame rate.

At 416, the method 400 may include rendering a stream of audio for the server-side rendered application program based on the set of audio tuning parameters. In one example, rendering the stream of audio for the server-side rendered application program based on the set of audio tuning parameters may be performed by a server-side dedicated audio processor of the server system. In another example, the server computing device may perform the audio rendering.

As discussed above with reference to FIG. 3, the audio may be rendered using third-party audio rendering software. In this example, the audio tuning parameters for the third-party audio rendering software may be determined at least in part by sending the set of client audio parameters to a third-party audio server, and receiving the set of audio tuning parameters from the third-party audio server, the set of audio tuning parameters being determined based on the set of client audio parameters. The received audio tuning parameters may be used to configure the third-party audio rendering software for rendering the audio at step 416.

At 418, the method 400 may include sending the stream of visual data and the stream of audio to the client computing device. The stream of visual data and the stream of audio may be sent over the computer network.

At 420, at the client computing device, the method 400 may include receiving the stream of visual data and the stream of audio for the server-side rendered application program from the server system. At 422, the method 400 may include presenting the stream of visual data via a display of the client computing device. At 424, the method 400 may include playing out the stream of audio via the sound output device.

In the method 400, the user may continue to enter user input that is sent to the server system at step 406, and the server system may continue to render visual data based on the user input at step 414 and corresponding audio at step 416. The stream of visual data and rendered audio may be streamed to the client computing device such that the user may enter input and be presented with corresponding visual data and audio.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
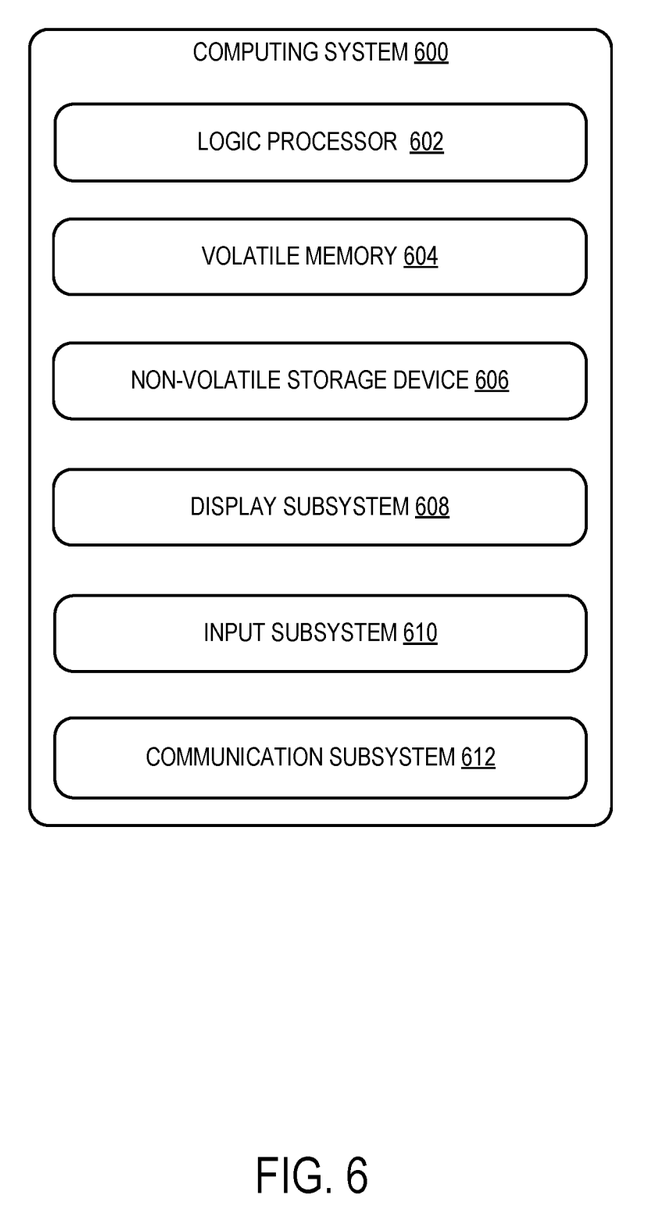
FIG. 6 shows a schematic view of an example computing environment in which the computing device of FIG. 1 may be enacted.

FIG. 6 schematically shows a non-limiting embodiment of a computing system 600 that can enact one or more of the methods and processes described above. Computing system 600 is shown in simplified form. Computing system 600 may embody the client computing device 14 and the server computing devices 22 described above and illustrated in FIG. 1. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FP GAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides a server system comprising at least one processor. The at least one processor is configured to receive a set of client audio parameters from a client computing device, determine a set of audio tuning parameters based on the set of client audio parameters, execute a server-side rendered application program for the client computing device, render a stream of visual data for the server-side rendered application program based on a stream of user input received from the client computing device, render a stream of audio for the server-side rendered application program based on the set of audio tuning parameters, and send the stream of visual data and the stream of audio to the client computing device. In this aspect, additionally or alternatively, the server system may further comprise a server-side dedicated audio processor configured to render the stream of audio for the server-side rendered application program based on the set of audio tuning parameters. In this aspect, additionally or alternatively, the rendered stream of audio for the server-side rendered application program may be rendered as stereo audio. In this aspect, additionally or alternatively, to determine the set of audio tuning parameters, the at least one processor may be further configured to send the set of client audio parameters to a third-party audio server, and receive the set of audio tuning parameters from the third-party audio server, the set of audio tuning parameters being determined based on the set of client audio parameters. In this aspect, additionally or alternatively, the set of client audio parameters may include a type of audio rendering software for rendering the stream of audio for the server-side rendered application program, and the at least one processor may be further configured to select the third-party audio server from among a plurality of third-party audio servers based on the type of audio rendering software in the set of client audio parameters. In this aspect, additionally or alternatively, the set of client audio parameters may include a hardware identifier for the client computing device. In this aspect, additionally or alternatively, the set of client audio parameters may include a hardware identifier for a sound output device communicatively coupled to the client computing device. In this aspect, additionally or alternatively, the sound output device may be selected from the group consisting of a headphone device, an earbud device, a speaker device, and a home theater sound system. In this aspect, additionally or alternatively, the set of client audio parameters may include a characteristic of the sound output device selected from the group consisting of a geometry, a frequency response, a sensitivity, and an impedance. In this aspect, additionally or alternatively, the set of client audio parameters may include a user audio setting selected by a user of the client computing device. In this aspect, additionally or alternatively, the set of client audio parameters may include an indication of whether a sound output device is currently communicatively coupled to the client computing device. In this aspect, additionally or alternatively, the at least one processor may be configured to communicate with a client application executed by a processor of the client computing device. The client application may be configured to cause the processor to detect a sound output device communicatively coupled to the client computing device, determine the set of client audio parameters for a user of the client computing device, send the set of client audio parameters to the server system, send the stream of user input for the server-side rendered application program to the server system, receive the stream of visual data and the stream of audio for the server-side rendered application program from the server system, present the stream of visual data via a display of the client computing device, and playout the stream of audio via the sound output device.

Another aspect provides a method comprising, at a processor of a server system, receiving a set of client audio parameters from a client computing device, determining a set of audio tuning parameters based on the set of client audio parameters, executing a server-side rendered application program for the client computing device, rendering a stream of visual data for the server-side rendered application program based on a stream of user input received from the client computing device, rendering a stream of audio for the server-side rendered application program based on the set of audio tuning parameters, and sending the stream of visual data and the stream of audio to the client computing device. In this aspect, additionally or alternatively, rendering the stream of audio for the server-side rendered application program based on the set of audio tuning parameters may be performed by a server-side dedicated audio processor of the server system. In this aspect, additionally or alternatively, determining the set of audio tuning parameters may further comprises sending the set of client audio parameters to a third-party audio server, and receiving the set of audio tuning parameters from the third-party audio server, the set of audio tuning parameters being determined based on the set of client audio parameters. In this aspect, additionally or alternatively, the method may further comprise, at a processor of the client computing device, detecting a sound output device communicatively coupled to the client computing device, determining the set of client audio parameters for a user of the client computing device, sending the set of client audio parameters to the server system, sending the stream of user input for the server-side rendered application program to the server system, receiving the stream of visual data and the stream of audio for the server-side rendered application program from the server system, presenting the stream of visual data via a display of the client computing device, and playing out the stream of audio via the sound output device. In this aspect, additionally or alternatively, the set of client audio parameters may include a hardware identifier for a sound output device communicatively coupled to the client computing device. In this aspect, additionally or alternatively, the sound output device may be selected from the group consisting of a headphone device, an earbud device, a speaker device, and a home theater sound system. In this aspect, additionally or alternatively, the set of client audio parameters may include a characteristic of the sound output device selected from the group consisting of a geometry, a frequency response, a sensitivity, and an impedance.

Another aspect provides a server system comprising at least one processor. The at least one processor is configured to receive a set of client audio parameters from a client computing device, determine a set of audio tuning parameters based on the set of client audio parameters, execute a server-side rendered application program for the client computing device, render a stream of audio for the server-side rendered application program based on the set of audio tuning parameters, and send the stream of audio to the client computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server system comprising:
   at least one processor configured to:
   execute a server-side rendered application program for a client computing device;
   receive a set of client audio parameters from the client computing device, wherein the set of client audio parameters indicates at least a type of audio rendering software for rendering a stream of audio for the server-side rendered application program;
   select a third-party audio server from among a plurality of third-party audio servers based on the type of audio rendering software indicated by the set of client audio parameters;
   send one or more client audio parameters of the set to the selected third-party audio server;
   receive a set of audio tuning parameters from the selected third-party audio server based on the one or more client audio parameters sent to the selected third-party audio server;
   render a stream of visual data for the server-side rendered application program based on a stream of user input received from the client computing device;
   render the stream of audio for the server-side rendered application program based on the set of audio tuning parameters; and
   send the stream of visual data and the stream of audio to the client computing device.

2. The server system of claim 1, wherein the server system further comprises a server-side dedicated audio processor configured to render the stream of audio for the server-side rendered application program based on the set of audio tuning parameters.

3. The server system of claim 1, wherein the rendered stream of audio for the server-side rendered application program is rendered as stereo audio.

4. The server system of claim 1, wherein the set of client audio parameters includes a hardware identifier for the client computing device.

5. The server system of claim 1, wherein the set of client audio parameters includes a hardware identifier for a sound output device communicatively coupled to the client computing device.

6. The server system of claim 5, wherein the sound output device is selected from the group consisting of a headphone device, an earbud device, a speaker device, and a home theater sound system.

7. The server system of claim 1, wherein the set of client audio parameters includes a characteristic of the sound output device selected from the group consisting of a geometry, a frequency response, a sensitivity, and an impedance.

8. The server system of claim 1, wherein the set of client audio parameters includes a user audio setting selected by a user of the client computing device.

9. The server system of claim 1, wherein the set of client audio parameters includes an indication of whether a sound output device is currently communicatively coupled to the client computing device.

10. The server system of claim 1, wherein the at least one processor is configured to communicate with a client application executed by the client computing device, the client application being configured to cause the client computing device to:
    detect a sound output device communicatively coupled to the client computing device;
    determine the set of client audio parameters for a user of the client computing device;
    send the set of client audio parameters to the server system;
    send the stream of user input for the server-side rendered application program to the server system;
    receive the stream of visual data and the stream of audio for the server-side rendered application program from the server system;
    present the stream of visual data via a display of the client computing device; and
    playout the stream of audio via the sound output device.

11. A method comprising:
    at a processor of a server system:
    executing a server-side rendered application program for a client computing device;
    receiving a set of client audio parameters from the client computing device, wherein the set of client audio parameters indicates at least a type of audio rendering software for rendering a stream of audio for the server-side rendered application program;
    selecting a third-party audio server from among a plurality of third-party audio servers based on the type of audio rendering software indicated by the set of client audio parameters;
    sending one or more client audio parameters of the set to the selected third-party audio server;
    receiving a set of audio tuning parameters from the selected third-party audio server based on the one or more client audio parameters sent to the selected third-party audio server;
    rendering a stream of visual data for the server-side rendered application program based on a stream of user input received from the client computing device;
    rendering the stream of audio for the server-side rendered application program based on the set of audio tuning parameters; and
    sending the stream of visual data and the stream of audio to the client computing device.

12. The method of claim 11, wherein rendering the stream of audio for the server-side rendered application program based on the set of audio tuning parameters is performed by a server-side dedicated audio processor of the server system.

13. The method of claim 11, further comprising:
    at a processor of the client computing device:
    detecting a sound output device communicatively coupled to the client computing device;
    determining the set of client audio parameters for a user of the client computing device;
    sending the set of client audio parameters to the server system;
    sending the stream of user input for the server-side rendered application program to the server system;
    receiving the stream of visual data and the stream of audio for the server-side rendered application program from the server system;
    presenting the stream of visual data via a display of the client computing device; and
    playing out the stream of audio via the sound output device.

14. The method of claim 11, wherein the set of client audio parameters includes a hardware identifier for a sound output device communicatively coupled to the client computing device.

15. The method of claim 14, wherein the sound output device is selected from the group consisting of a headphone device, an earbud device, a speaker device, and a home theater sound system.

16. The method of claim 11, wherein the set of client audio parameters includes a characteristic of the sound output device selected from the group consisting of a geometry, a frequency response, a sensitivity, and an impedance.

17. A server system comprising:
 at least one processor configured to:
  execute a server-side rendered application program for a client computing device;
  receive a set of client audio parameters from the client computing device, wherein the set of client audio parameters indicates at least a type of audio rendering software for rendering a stream of audio for the server-side rendered application program;
  select a third-party audio server from among a plurality of third-party audio servers based on the type of audio rendering software indicated by the set of client audio parameters;
  send one or more client audio parameters of the set to the selected third- party audio server;
  receive a set of audio tuning parameters from the selected third-party audio server based on the one or more client audio parameters sent to the selected third-party audio server;
  render the stream of audio for the server-side rendered application program based on the set of audio tuning parameters; and
  send the stream of audio to the client computing device.

18. The server system of claim 17, wherein the server system further comprises a server-side dedicated audio processor configured to render the stream of audio for the server-side rendered application program based on the set of audio tuning parameters.

19. The server system of claim 17, wherein the set of client audio parameters includes a hardware identifier for the client computing device.

20. The server system of claim 17, wherein the set of client audio parameters includes a hardware identifier for a sound output device communicatively coupled to the client computing device.

* * * * *